A. W. COATES.
Horse Hay-Rakes.

No. 158,471. Patented Jan. 5, 1875.

WITNESSES:

INVENTOR:
A. W. Coates

BY
ATTORNEYS.

UNITED STATES PATENT OFFICE.

AMOS W. COATES, OF ALLIANCE, OHIO.

IMPROVEMENT IN HORSE HAY-RAKES.

Specification forming part of Letters Patent No. 158,471, dated January 5, 1875; application filed November 16, 1874.

*To all whom it may concern:*

Be it known that I, AMOS W. COATES, of Alliance, in the county of Stark and State of Ohio, have invented a new and Improved Horse Hay-Rake; and I do hereby declare that the following is a full, clear, and exact description of the same, reference being had to the accompanying drawing, forming a part of this specification, in which—

Figure 1:
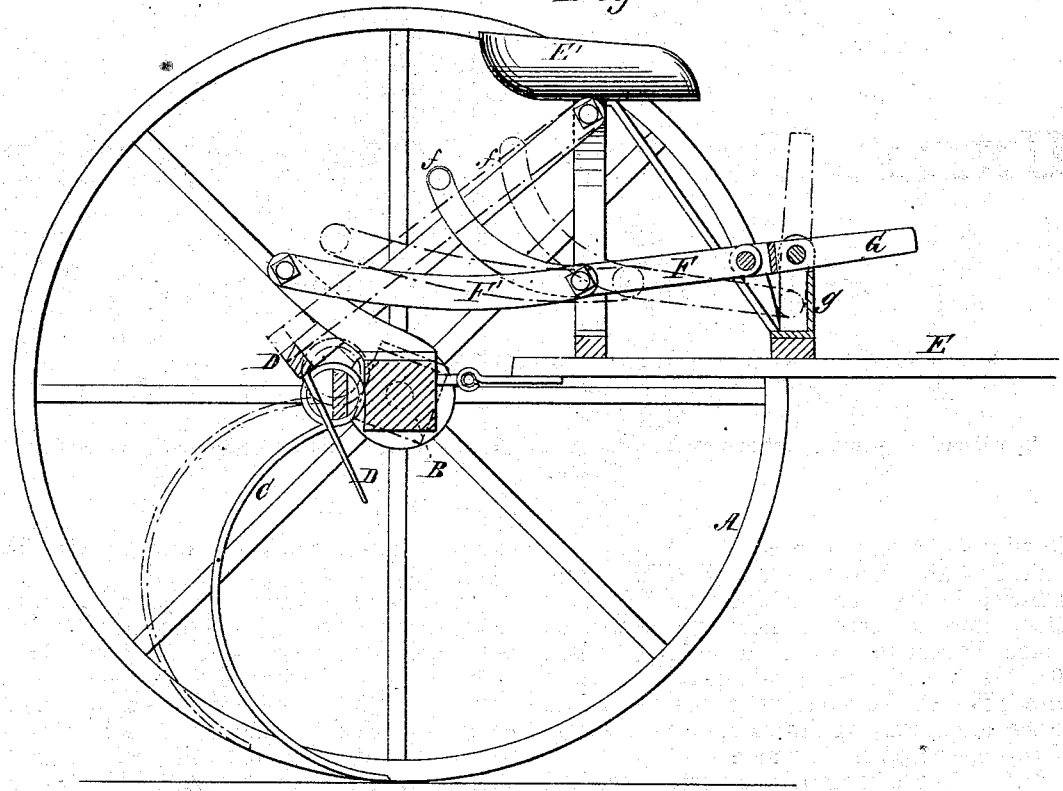
Figure 2:
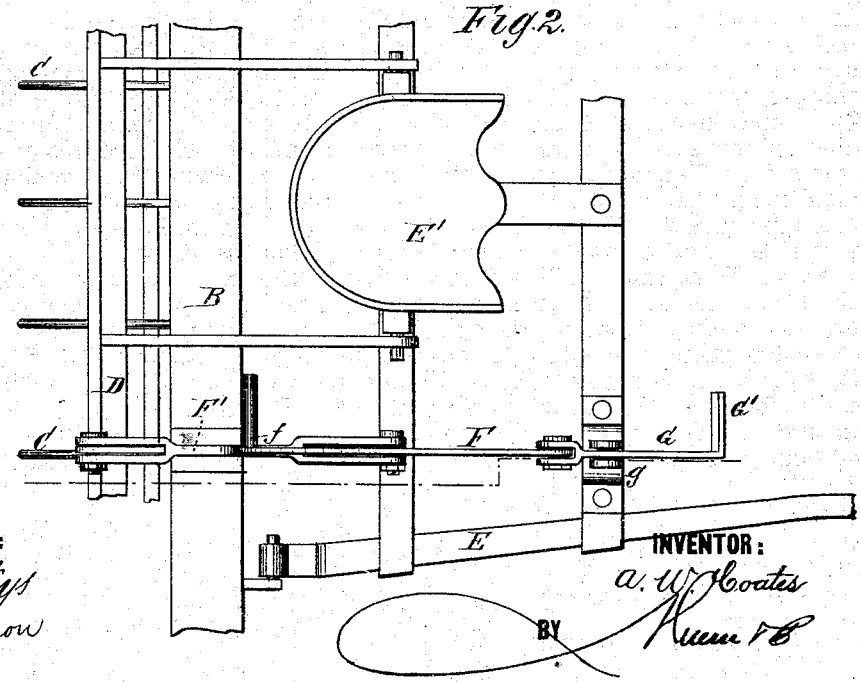

Figure 1 is a longitudinal vertical section. Fig. 2 is a plan view.

The invention relates to means whereby a horse-rake on wheels may be more conveniently held in different positions while performing its work.

The improvement will first be fully described in connection with all that is necessary to a full understanding thereof, and then pointed out in the claim.

A A represent the wheels; B, the oscillating axle; C, the rake; D, the automatic rake-clearer, and E the shafts. On the latter is, as usual, located the driver's seat E', and within reach the handle $f$ of the toggle-levers F' F, the former of these levers being pivoted to the axle, while the latter is pivoted to the short arm of a foot-lever, G. This foot-lever is fulcrumed over a front-closed and rear-open upright box, $g$, and provided with a bend or stirrup, G', whereon the driver may press his foot. The short arm of this lever is held firmly in a perpendicular position, or nearly so, by the front or closed side of the box, so that when the toggle is straightened the rake will be held firmly at a certain height above the ground. When, however, it is desired to bring it in closer proximity upon very clean, rolled, or level ground, the rake may be thrown with the points of its teeth under the axle and very close to the earth, and thereby more readily gather the hay out of any hollow the teeth are passing over, and being held in that position by the toggle pressing the lever G in a line passing above its fulcrum. This affords a great advantage in raking hay, since it enables the operator to run his rake low on smooth and comparatively high or rough ground.

Having thus described my invention, what I claim as new is—

The foot-lever G G', pivoted over a front-closed and rear-open box, $g$, and combined on a hay-rake with the toggle F F', as and for the purpose specified.

AMOS W. COATES.

Witnesses:
JOSEPH J. PARKER,
AMOS B. CASSELMAN.